Patented Sept. 27, 1932

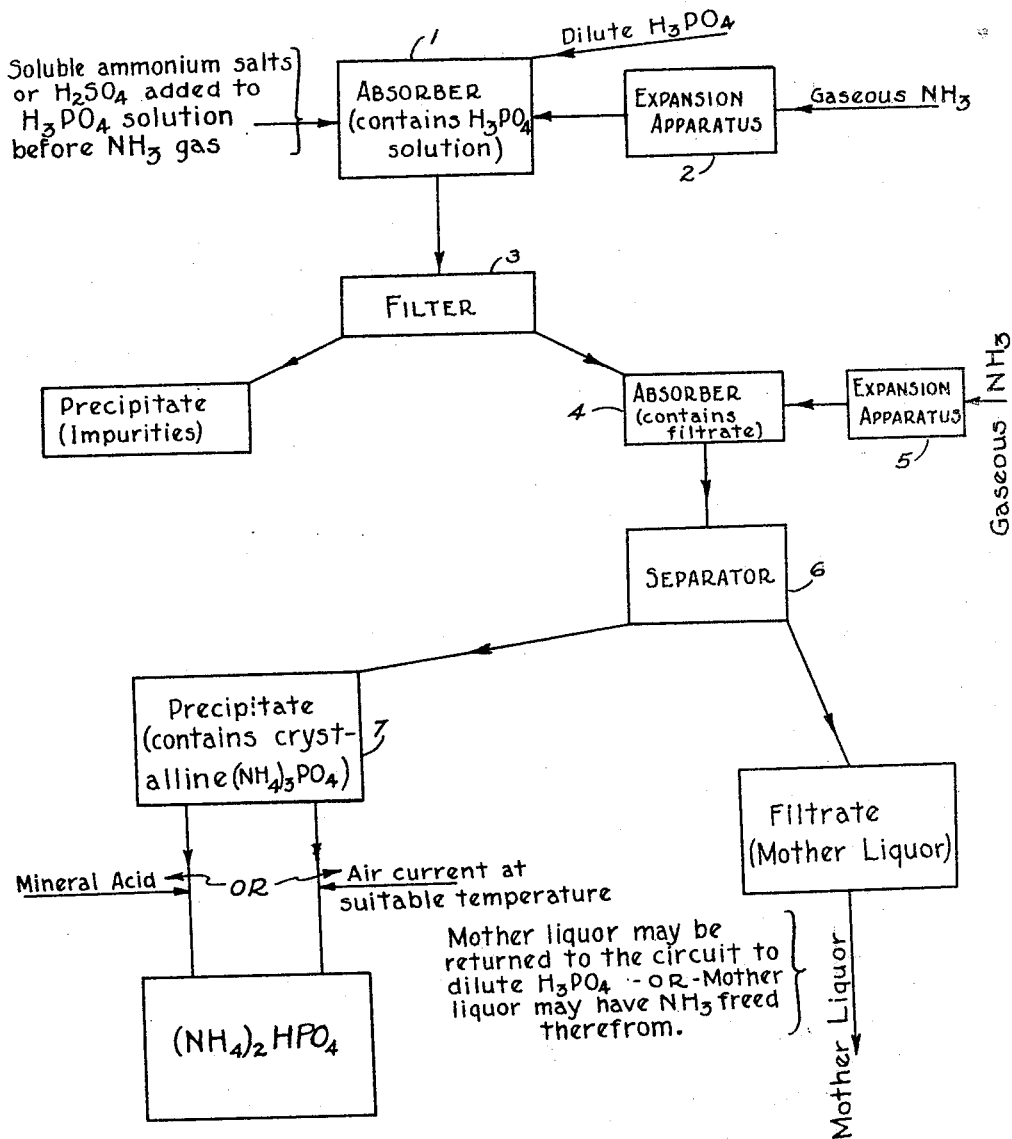

1,879,204

UNITED STATES PATENT OFFICE

JOSEPH GUILLISSEN, OF BRUSSELS, BELGIUM, ASSIGNOR TO UNION CHIMIQUE BELGE, SOCIETE ANONYME, OF BRUSSELS, BELGIUM

PRODUCTION OF AMMONIUM PHOSPHATES

Application filed December 20, 1929, Serial No. 415,623, and in Germany, France, and Great Britain February 22, 1929.

This invention relates to an improved process for the production of ammonium phosphates, more particularly of triammonium phosphate, which permits of reducing the costly operations of evaporation of solutions of phosphoric acid or of mono-ammonium phosphate, which are unavoidable in other known processes, and to obtain in an easy manner, a pure tri-ammonium phosphate free from impurities such as iron salts, alumina and lime.

The invention consists in a process for obtaining pure tri-ammonium phosphate by the reaction between an excess of ammonia and a solution of phosphoric acid containing impurities such as iron salts, alumina and lime, in which the solution is saturated partly with ammonia until the impurities are precipitated, the precipitate being thereupon separated from the solution, the latter being then treated with an excess of ammonia until the bulk of the tri-ammonium phosphate is precipitated.

When gaseous ammonia is used, it can be subjected to expansion, prior to its admission into the solution with a view to precipitating the tri-ammonium phosphate; the expansion of the ammonia is carried out in a suitable vessel so situated relatively to the vessel containing the phosphoric acid or phosphate solution, that the latter solution is cooled.

For the purpose of making my invention more clearly understood I have shown in the accompanying drawing means for carrying the same into practical effect without limiting the improvements in their useful applications to the particular method, which, for the purpose of explanation, has been made the subject of illustration.

The single view disclosed in the drawing is a diagramatic representation of a flow sheet for carrying out the method forming the subject matter of the invention.

As may be noted the reference numeral 1 denotes a suitable absorber for containing the phosphoric acid solution undergoing treatment. Gaseous ammonia after expansion in a suitable expansion device 2 is introduced into the absorber 1. Prior to admitting the ammonia gas into the absorber soluble ammonium salts are introduced into the phosphoric acid solution or sulphuric acid may be added thereto for a purpose which will hereinafter appear.

A sufficient amount of ammonia is introduced into the absorber to cause the precipitation of the impurities contained in the phosphoric acid which are separated therefrom by means of a suitable filter 3, the filtrate being conducted into a second absorber 4, where it is saturated with gaseous ammonia after expansion in a suitable device 5.

The second saturation of the solution results in the formation of tri-ammonium phosphate which is separated therefrom in a suitable separating device 6, the filtrate or mother liquor being freed from ammonia which may be used over again or the mother liquor is returned to the circuit for diluting the phosphoric acid.

After separation of the tri-ammonium phosphate, which is in the crystalline form, and may be conducted from the separator to a suitable container or vessel 7, it may be treated with a mineral acid, such as phosphoric acid or an air current at a suitable temperature may be passed through it to decompose it into bi-ammonium phosphate.

The table given below shows the results of a series of eleven tests made at a temperature of 15° C.

The first column gives the number of the test; the second column gives the total amount of free ammonia (grams per liter) in solution, the third column gives the $P_2O_5$ (grams per liter) in solution, the fourth column gives the $NH_3$ corresponding to the $P_2O_5$ which is necessary for the formation of pure $(NH_4)_3PO_4$, and the fifth column gives the $NH_3$ which is missing or in excess relatively to the amount necessary for the formation of $(NH_3)_3PO_4$ (that is, the difference between the figures given in the second and in the fourth column).

| I | II | III | IV | V |
|---|---|---|---|---|
| Number of test | Free ammonia in solution grams per liter | $P_2O_5$ content of solution grams per liter | $NH_3$ corresponding to $P_2O_5$ in the ammonium phosphate | $NH_3$ missing (−) or in excess (+) available for formation of $(NH_4)_3PO_4$ |
| 1 | 33.72 | 47.81 | 34.38 | −0.66 |
| 2 | 34.78 | 34.46 | 24.78 | +10.00 |
| 3 | 33.72 | 32.87 | 23.64 | +10.08 |
| 4 | 36.54 | 25.19 | 18.12 | +18.42 |
| 5 | 37.74 | 22.86 | 16.44 | +21.30 |
| 6 | 43.02 | 20.10 | 14.46 | +28.56 |
| 7 | 49.72 | 17.60 | 12.66 | +37.06 |
| 8 | 65.60 | 10.01 | 7.20 | +58.40 |
| 9 | 81.70 | 6.59 | 4.74 | +76.96 |
| 10 | 92.88 | 5.34 | 3.84 | +89.04 |
| 11 | 316.00 | 0.20 | 0.14 | +315.86 |

It is seen that according as the excess of ammonia increases, the amount of $P_2O_5$ which remains in solution, diminishes. For an excess of ammonia (test number 11) of +315.86, the amount of $P_2O_5$ which remains in solution is only 0.20 grams per liter.

In practice, it is of course not always necessary to carry the precipitation of the phosphate so far. The proportion of tri-ammonium phosphate to be precipitated is determined in practice according to the respective prices of ammonia and of phosphoric acid.

For the carrying of the invention into effect, use is preferably made of a diluted solution of phosphoric acid.

The major part of the solution separated from the precipitated tri-ammonium phosphate may be used direct for diluting the acid used in the manufacture and may thus be left in the circuit.

It has been found by experience that the presence of soluble ammonium salts, such as the sulfate facilitates the precipitation of tri-ammonium phosphate. The said salts may be added to the solution prior to the admission of ammonia or they may be formed inside the solution by the admission of a suitable acid, such as sulphuric acid.

Thus, by adding aqueous sulphuric acid, sulfate of ammonium is formed inside the solution, and the insolubility of the tri-ammonium phosphate is increased, thus facilitating its precipitation.

The solution may be thrown away without great loss, after its ammonia has been recovered, or the small quantities of phosphoric acid which it may contain, may be recovered, if necessary, by precipitating them in the form of bi-calcium phosphate. This removal of ammonia from the residual liquor may be effected in an ordinary cast-iron or iron apparatus, whilst the evaporation of phosphoric acid or of mono-ammonium phosphate in the known processes required costly apparatus made of materials which resist to corrosion by the said substances.

The tri-ammonium phosphate obtained after separation by centrifugal action, may be dried at a suitable temperature in a current of air, which decomposes the tri-ammonium phosphate into bi-ammonium phosphate and free ammonia, and the latter may be utilized for saturating a fresh amount of phosphoric acid.

In certain cases it has however been found advantageous to obtain the bi-ammonium phosphate by treating the tri-ammonium phosphate, in a crystallized, dry state, with a concentrated solution of phosphoric acid (50% of $P_2O_5$ for instance).

The phosphoric acid may be replaced in certain cases by another acid, such as concentrated sulfuric acid.

The addition of phosphoric acid containing 50% of $P_2O_5$ converts tri-ammonium phosphate into bi-ammonium phosphate and the amount of water introduced by the acid, dissolves until saturation point, part of the bi-ammonium phosphate produced.

Although this solubility is high, a small portion only of the bi-ammonium phosphate is dissolved because the amount of water brought in is very small.

As a consequence ⅘th of bi-ammonium phosphate produced is not dissolved and may be separated from the saturated solution by turbining or filtration.

The small amount of saturated solution of bi-ammonium phosphate may be dried without the necessity of employing a complicated apparatus as would be required for decomposing the tri-ammonium phosphate so as to recuperate the ammonia evolved. Moreover, in the latter case, it is difficult to conduct the operation so as to obtain pure bi-ammonium phosphate without mono-ammonium phosphate.

*Example*

One kilo of a solution of phosphoric acid obtained by treating a natural phosphate with sulphuric acid, and containing 280 grams of $P_2O_5$ is diluted with 600 cc. of water, then saturated with a current of ammonia until the salts of iron, alumina, lime etc. which it contains, are precipitated. The solution is filtered and the precipitate is washed. The filtrate and water used for washing weigh together about 1700 grams. This liquor is saturated again by a current of $NH_3$ until the solution contains an excess of about 9% of free ammonia (see test number 10 of the table) +89.04 grams per liter of free ammonia. About 800 grams of tri-ammonium phosphate are precipitated and the mother liquor separated from the precipitate weighs about 0.9 kilo of which 0.6 kilo are used for diluting a fresh kilo of phosphoric acid and 0.3 kilo are boiled for liberating the ammonia. By admitting that the $P_2O_5$ contained in the 0.3 kilo of liquor are lost, this would represent—(see test number 10, third column of the table) $5.34 \times 0.3 = 1.602$ grams of $P_2O_5$ from the original 280 grams.

I claim:

A process for obtaining solid, pure, stable di-ammonium phosphate, consisting in treating dry, crystallized, tri-ammonium phosphate with the calculated quantity of a concentrated solution of phosphoric acid in order to produce the di-ammonium salt; and then drying the product without the application of heat.

JOSEPH GUILLISSEN.